US010007536B2

United States Patent
Sugihara

(10) Patent No.: US 10,007,536 B2
(45) Date of Patent: Jun. 26, 2018

(54) VIRTUALIZATION SYSTEM, SWITCH CONTROLLER, FIBER-CHANNEL SWITCH, MIGRATION METHOD AND MIGRATION PROGRAM

(71) Applicant: Tomoaki Sugihara, Tokyo (JP)

(72) Inventor: Tomoaki Sugihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 479 days.

(21) Appl. No.: 13/826,167

(22) Filed: Mar. 14, 2013

(65) Prior Publication Data

US 2013/0263130 A1 Oct. 3, 2013

(30) Foreign Application Priority Data

Mar. 30, 2012 (JP) .................................. 2012-079633

(51) Int. Cl.
G06F 9/455 (2018.01)
H04L 12/713 (2013.01)
H04L 29/08 (2006.01)
H04L 12/721 (2013.01)

(52) U.S. Cl.
CPC .......... *G06F 9/455* (2013.01); *G06F 9/45558* (2013.01); *G06F 2009/4557* (2013.01); *H04L 45/586* (2013.01); *H04L 45/66* (2013.01); *H04L 67/322* (2013.01)

(58) Field of Classification Search
CPC ................ G06F 9/455; G06F 9/45558; G06F 2009/4557; H04L 45/586; H04L 45/66; H04L 67/322
See application file for complete search history.

(56) References Cited

U.S. PATENT DOCUMENTS

| 7,307,948 | B2 | 12/2007 | Infante et al. |
| 7,933,993 | B1 * | 4/2011 | Skinner ................. G06F 9/5077 709/209 |
| 8,510,815 | B2 | 8/2013 | Sekiguchi et al. |
| 8,607,230 | B2 | 12/2013 | Hatta et al. |
| 8,683,025 | B2 | 3/2014 | Minato |

(Continued)

FOREIGN PATENT DOCUMENTS

| JP | 2006-504186 A | 2/2006 |
| JP | 2009-140053 A | 12/2007 |

(Continued)

OTHER PUBLICATIONS

Japanese Office Action for JP Application No. 2012-079633 dated Jan. 5, 2016 with English Translation.

(Continued)

*Primary Examiner* — Lewis A Bullock, Jr.
*Assistant Examiner* — Kevin X Lu

(57) ABSTRACT

A virtualization system comprises a plurality of host machines on which a virtual machine operates, a plurality of storages connected to the host machines through a fiber-channel switch; and a switch controller, the switch controller including a migration management unit which instructs the host machine on migration of the virtual machine, wherein the migration management unit instructs the fiber-channel switch connected to a migration destination to set host bus information so as to allow an access to the storage used at a migration source by the virtual machine which has migrated.

8 Claims, 19 Drawing Sheets

(56) References Cited

U.S. PATENT DOCUMENTS

| | | | |
|---|---|---|---|
| 8,750,311 B2* | 6/2014 | Ayandeh | 370/392 |
| 2004/0078632 A1 | 4/2004 | Infante et al. | |
| 2005/0080982 A1* | 4/2005 | Vasilevsky | G06F 3/0607 711/1 |
| 2007/0143497 A1 | 6/2007 | Kottomtharayil et al. | |
| 2009/0116507 A1* | 5/2009 | Kanda | 370/464 |
| 2009/0307341 A1 | 12/2009 | Minato | |
| 2010/0070722 A1 | 3/2010 | Otani et al. | |
| 2010/0122111 A1* | 5/2010 | Allen | G06F 11/2005 714/3 |
| 2010/0198972 A1* | 8/2010 | Umbehocker | G06F 3/0604 709/226 |
| 2010/0313256 A1 | 12/2010 | Sekiguchi et al. | |
| 2012/0131576 A1 | 5/2012 | Hatta et al. | |
| 2012/0254554 A1* | 10/2012 | Nakajima | 711/154 |
| 2013/0046892 A1* | 2/2013 | Otani | G06F 15/173 709/226 |
| 2013/0055240 A1* | 2/2013 | Gondi | 718/1 |
| 2013/0185721 A1* | 7/2013 | Ikegami et al. | 718/1 |

FOREIGN PATENT DOCUMENTS

| | | |
|---|---|---|
| JP | 2009-134687 A | 6/2009 |
| JP | 2009-294810 A | 12/2009 |
| JP | 2010-039685 A | 2/2010 |
| JP | 2010-073202 A | 4/2010 |
| JP | 2010-097533 A | 4/2010 |
| JP | 2010-113707 | 5/2010 |
| JP | 2010-128791 A | 6/2010 |
| JP | 2010-282447 A | 12/2010 |
| JP | 2011-134296 A | 7/2011 |
| JP | 2012-108816 A | 6/2012 |
| JP | 2012-220977 | 11/2012 |
| JP | 2012-243298 | 12/2012 |
| JP | 2013-125284 | 6/2013 |
| WO | 2011/135637 A1 | 11/2011 |

OTHER PUBLICATIONS

Japanese Office Action for JP Application No. 2012-079633 dated Aug. 16, 2016 with English Translation.

* cited by examiner

FIG. 5

MANAGEMENT TABLE (IN SWITCH CONTROLLER) 301

| HOST NAME | VM NAME | PHYSICAL HBA (WWNN INFORMATION) | PHYSICAL HBA (WWPN INFORMATION) | 24-bit ADDRESS CORRESPOND -ING TO WWPN | WWNN TO BE REPLACED | WWPN TO BE REPLACED |
|---|---|---|---|---|---|---|
| HOST SERVER A | VM-A | Server-HBA-A | Server-HBA-A-1 | 01AB00 | | |
| HOST SERVER B | | Server-HBA-B | Server-HBA-B-1 | 02FF01 | | |

FIG. 7

MANAGEMENT TABLE (IN SWITCH CONTROLLER) DETAILED VERSION 301

| HOST NAME | VM NAME | PHYSICAL HBA (WWNN INFORMATION) | PHYSICAL HBA (WWPN INFORMATION) | 24-bit ADDRESS CORRESPONDING TO WWPN | WWNN TO BE REPLACED | WWPN TO BE REPLACED |
|---|---|---|---|---|---|---|
| HOST SERVER A | VM-A | Server-HBA-A | Server-HBA-A-1 | 01AB00 | | |
| HOST SERVER B | | Server-HBA-B | Server-HBA-B-1 | 02FF01 | | |

CHANGED TO THE FOLLOWING

| HOST NAME | VM NAME | PHYSICAL HBA (WWNN INFORMATION) | PHYSICAL HBA (WWPN INFORMATION) | 24-bit ADDRESS CORRESPONDING TO WWPN | WWNN TO BE REPLACED | WWPN TO BE REPLACED |
|---|---|---|---|---|---|---|
| HOST SERVER A | | Server-HBA-A | Server-HBA-A-1 | 01AB00 | | |
| HOST SERVER B | VM-A | Server-HBA-B | Server-HBA-B-1 | 02FF01 | Server-HBA-A | Server-HBA-A-1 |

FIG. 12

| Bits Word | 31-24 | 23-16 | 15-08 | 07-00 |
|---|---|---|---|---|
| 0 | R_CTL | D_ID | | |
| 1 | CS_CTL | S_ID | | |
| 2 | TYPE | F_CTL | | |
| 3 | SEQ_ID | DF_CTL | SEQ_CNT | |
| 4 | OX_ID | | RX_ID | |
| 5 | PARAMETER | | | |

FIG. 14

| FORMER STORAGE | FORMER LUN | NEW STORAGE | NEW LUN |
|---|---|---|---|
| St0001 | LUN00005 | St0002 | LUN00011 |
| St0001 | LUN00006 | St0002 | LUN00012 |
|  |  |  |  |

VIRTUALIZATION SYSTEM, SWITCH CONTROLLER, FIBER-CHANNEL SWITCH, MIGRATION METHOD AND MIGRATION PROGRAM

INCORPORATION BY REFERENCE

This application is based upon and claims the benefit of priority from Japanese patent application No. 2012-079633, filed on Mar. 30, 2012, the disclosure of which is incorporated herein in its entirety by reference.

TECHNICAL FIELD

The present invention relates to a virtual machine migration technique, and more particularly, a technique for migration of a virtual machine which accesses a physical Host Bus Adapter (HBA).

BACKGROUND ART

Virtual machine environments have been increasingly developed with recent improvement in hardware performance and improvement in virtualization techniques. Flexibility of environment structures for virtualization has been increased as well to be able to assume various forms according to a request.

On the other hand, in a virtual machine environment, virtualization invites an increase in the amount of the processing to degrade access performance as compared with that in a physical environment. In order to mitigate such effect and improve the performance, techniques have been developed of executing more direct access.

Related art of the present invention is disclosed in Patent Literature 1 to Patent Literature 4.

Patent Literature 1 recites that fiber-channel (FC) frames directing a predetermined destination are all transferred to the predetermined destination. Patent Literature 2 recites that after switching an I/O device assigned to a guest OS of a shifting source to a physical computer on a shifting destination, a virtual computer and a guest OS on the shifting destination are activated to complete migration. Patent Literature 3 recites that a data center to which a migration request is to be sent is determined based on data center information. Patent Literature 4 recites that a differential memory image is transmitted to a migration destination virtual server.

Patent Literature 1: Japanese Patent Laying-Open No. 2011-134296
Patent Literature 2: Japanese Patent Laying-Open No. 2010-039685
Patent Literature 3: Japanese Patent Laying-Open No. 2009-134687
Patent Literature 4: Japanese Patent Laying-Open No. 2009-140053

Environment in which direct access is executed, however, causes a problem. The problem is difficulty in changing a physical environment. Since one of the advantages of virtualization systems is enabling flexible change of a virtualization environment without being affected by a physical environment, it is a crucial issue to ensure flexibility. Performance and flexibility are said to have a trade-off relation under these circumstances. Technique for enabling coexistence of performance and flexibility in a virtualization environment is accordingly demanded.

In a system using virtual machine (VM) and a Fiber-Channel Storage Area Network (FC-SAN), for example, it is a structure of a method of directly showing a disk to a VM (pass-through) that exhibits I/O performance of a storage disk most. Structure that shows a disk by pass-through has a problem that no migration is possible with a VM in operation.

OBJECT OF THE INVENTION

An object of the present invention is to solve the above-described problems and provide a virtualization system which causes migration of a virtual machine that accesses a physical HBA while in operation, a switch controller, a fiber-channel switch, a migration method and a migration program.

SUMMARY

According to a first exemplary aspect of the invention, a virtualization system comprises
a plurality of host machines on which a virtual machine operates,
a plurality of storages connected to the host machines through a fiber-channel switch, and
a switch controller, the switch controller including a migration management unit which instructs the host machine on migration of the virtual machine, wherein
the migration management unit instructs the fiber-channel switch connected to a migration destination to set host bus information so as to allow an access to the storage used at a migration source by the virtual machine which has migrated.

According to a second exemplary aspect of the invention, in a virtualization system comprising a plurality of host machines on which a virtual machine operates, a plurality of storages connected to the host machines through a fiber-channel switch, and a switch controller, wherein the switch controller comprises
a migration management unit which instructs the host machine on migration of the virtual machine, wherein
the migration management unit instructs the fiber-channel switch connected to a migration destination to set host bus information so as to allow an access to the storage used at a migration source by the virtual machine which has migrated.

According to a third exemplary aspect of the invention, in a virtualization system comprising a host machine on which a virtual machine operates, a plurality of storages connected to the host machines through a fiber-channel switch, and a switch controller, wherein the fiber-channel switch comprises
a checking unit which checks zoning upon receiving a host bus information setting instruction from a migration management unit of the switch controller, and
a setting unit which, when the zoning is set not to allow a host bus adapter of the host machine at a migration destination of the virtual machine to access the storage used at a migration source by the virtual machine, executes zoning so as to allow an access to the storage with reference to zoning of the host bus adapter at the migration source.

According to a fourth exemplary aspect of the invention, in a virtualization system comprising a plurality of host machines on which a virtual machine operates, a plurality of storages connected to the host machines through a fiber-channel switch, and a switch controller, a migration method comprises a migration management step of instructing the host machine on migration of the virtual machine by a migration management unit which the switch controller comprises, wherein the migration management step includes instructing the fiber-channel switch connected to a migration destination to set host bus information so as to allow an access to the storage used at a migration source by the virtual machine which has migrated.

According to a fifth exemplary aspect of the invention, a computer-readable medium storing a migration program in a virtualization system comprising a plurality of host machines on which a virtual machine operates, a plurality of storages connected to the host machines through a fiber-channel switch, and a switch controller, wherein the migration program causes a migration management unit of the switch controller comprises to execute the migration management processing of instructing the host machine on migration of the virtual machine, wherein the migration management processing includes instructing the fiber-channel switch connected to a migration destination to set host bus information so as to allow an access to the storage used at a migration source by the virtual machine which has migrated.

The present invention enables migration of a virtual machine which accesses a physical HBA.

BRIEF DESCRIPTION OF THE DRAWINGS

FIG. 5 is a diagram showing an example of a structure of a management table according to the first exemplary embodiment of the present invention;

FIG. 7 is a diagram showing an example of a structure of the management table according to the first exemplary embodiment of the present invention;

FIG. 12 is a diagram showing an example of arrangement of data involving WWN according to the first exemplary embodiment of the present invention;

FIG. 14 is a diagram showing an example of a structure of a management table which manages migration information of a storage in the first exemplary embodiment of the present invention;

EXEMPLARY EMBODIMENTS

Figure 1:
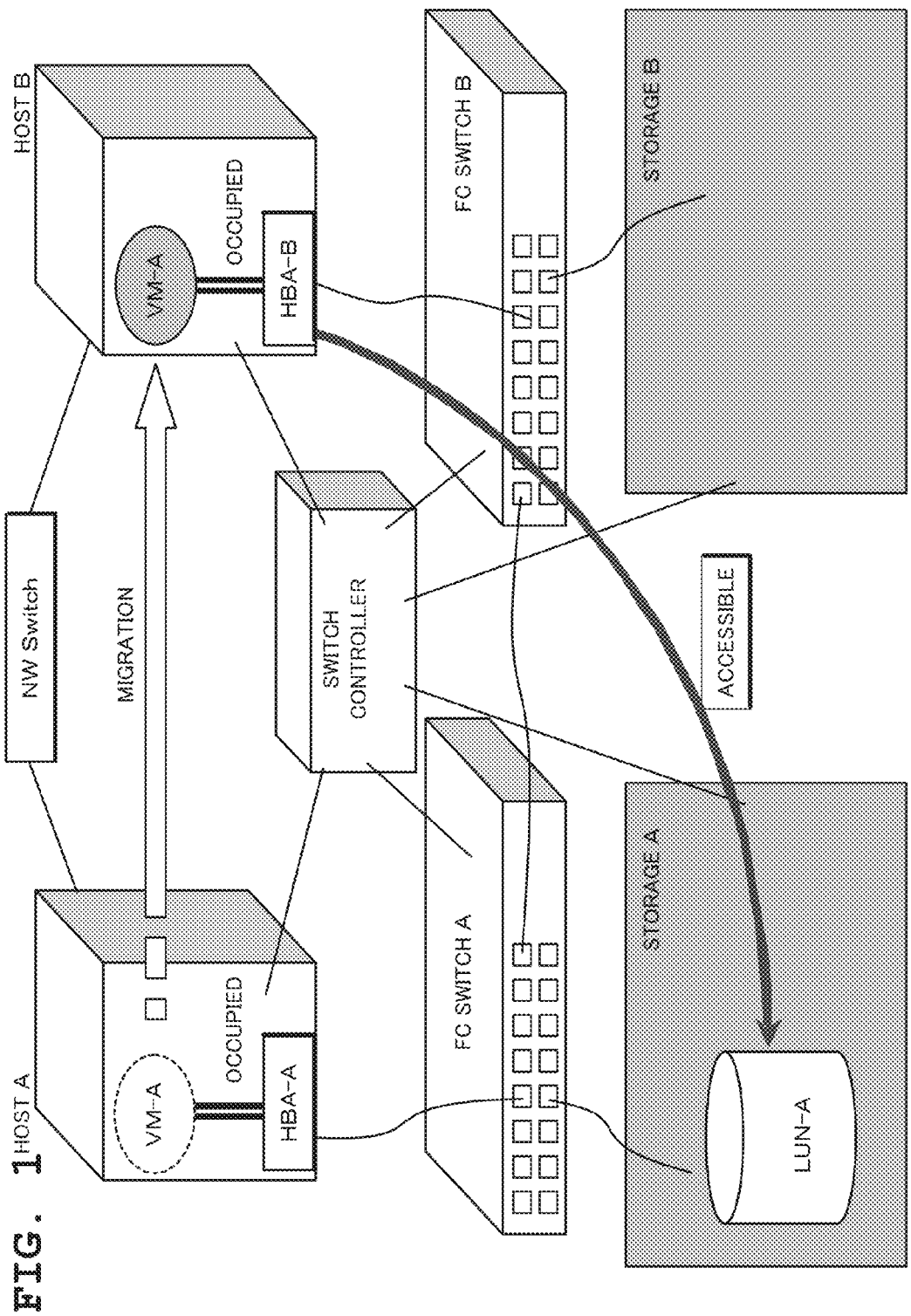
FIG. 1 is a block diagram showing characteristics of a virtualization system according to a first exemplary embodiment of the present invention.

The present invention is characterized in temporarily replacing information of a switch in FC-SAN and after migration (during migration), using a disk as of before the migration. It is also characterized in that a switch controller obtains information of VM from a VM host server and obtains WWN information held by an FC switch as well. It is further characterized in that upon migration, the switch controller appropriately changes setting of the switch based on environment information as of before migration and environment information of a migration destination, as well as replacing WWN information in the switch such that VM is allowed to operate also in the same manner at the migration destination as that of before the migration.

In order to clarify the foregoing and other objects, features and advantages of the present invention, exemplary embodiments of the present invention will be detailed in the following with reference to the accompanying drawings. Other technical problems, means for solving the technical problems and functions and effects thereof than the above-described objects of the present invention will become more apparent from the following disclosure of the exemplary embodiments. In all the drawings, like components are identified by the same reference numerals to appropriately omit description thereof.

First Exemplary Embodiment

First exemplary embodiment of the present invention will be detailed with reference to the drawings.

Figure 2:
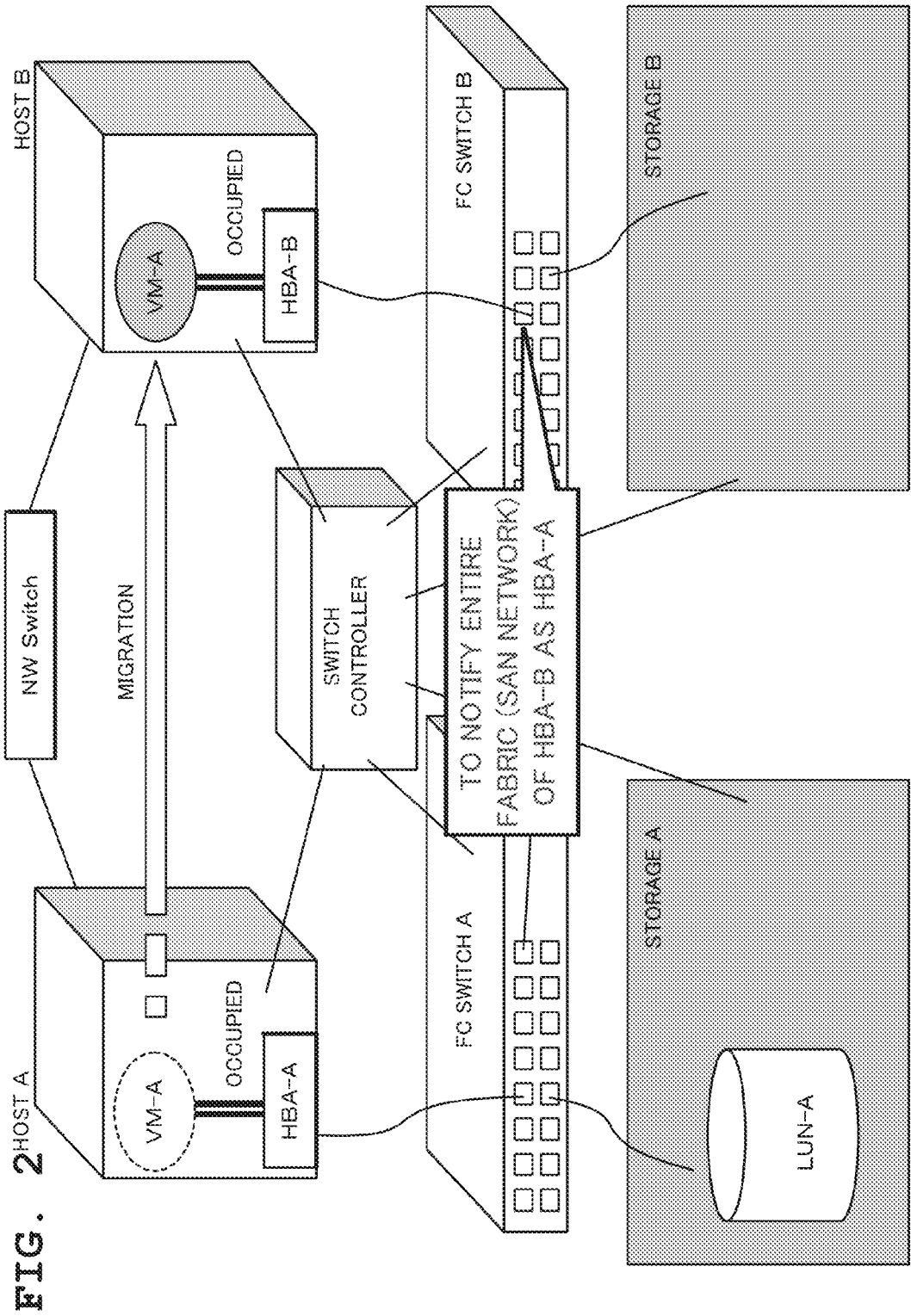
FIG. 2 is a block diagram showing characteristics of the virtualization system according to the first exemplary embodiment of the present invention.
Figure 3:
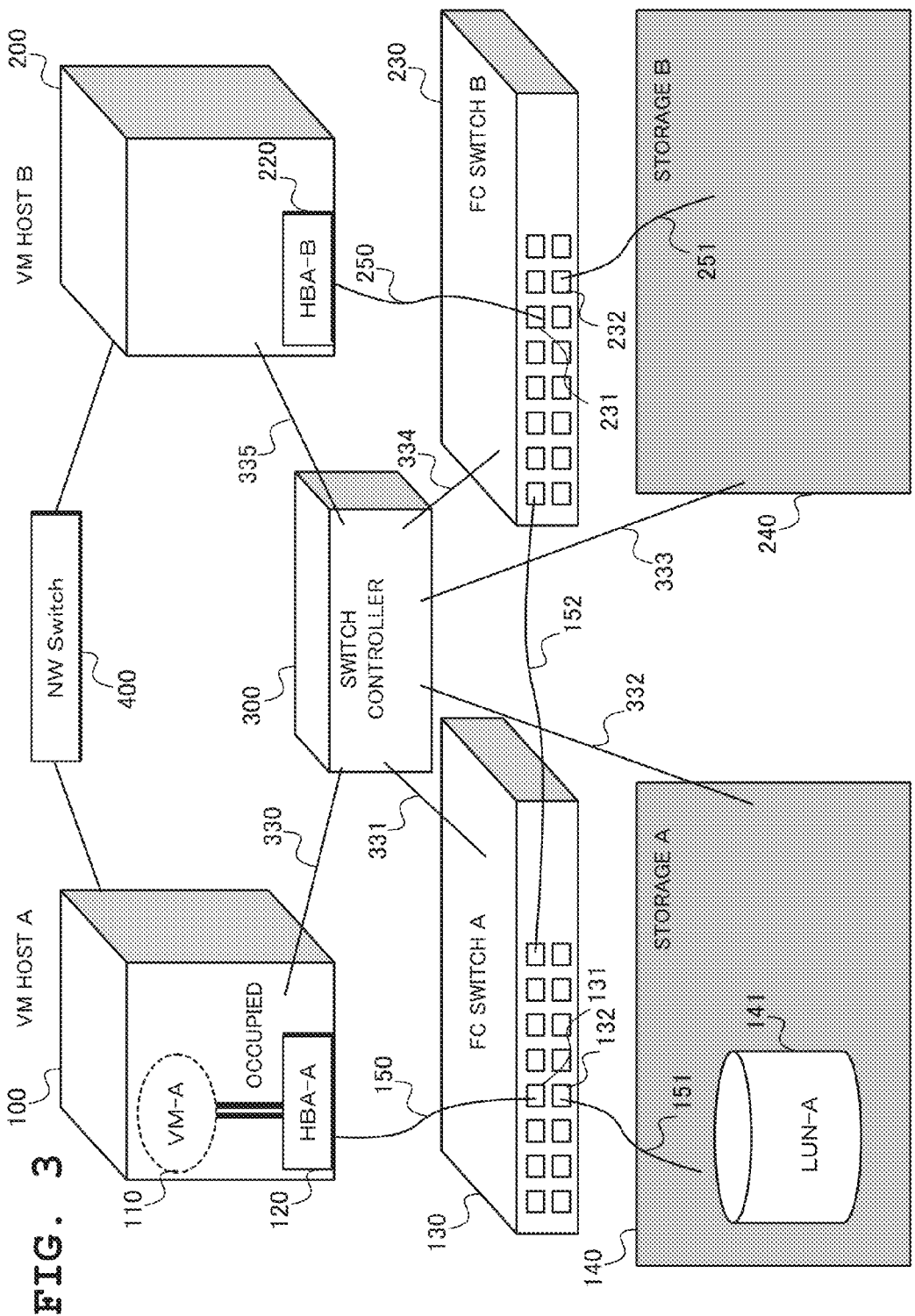
FIG. 3 is a block diagram showing a structure of the virtualization system according to the first exemplary embodiment of the present invention.

FIG. 1 and FIG. 2 are diagrams representing characteristics of a virtualization system 1000 according to the first exemplary embodiment of the present invention. FIG. 3 is a block diagram showing a structure of the virtualization system 1000 according to the present exemplary embodiment.

Description of the structure shown in FIG. 3 will be recited in the following.

VM host machines 100 and 200 are host machines allowed to have a pass-through structure. These host machines each provide an I/F externally operable through an Application Program Interface (API) such as a command and a library in the management of its VM.

Figure 18:
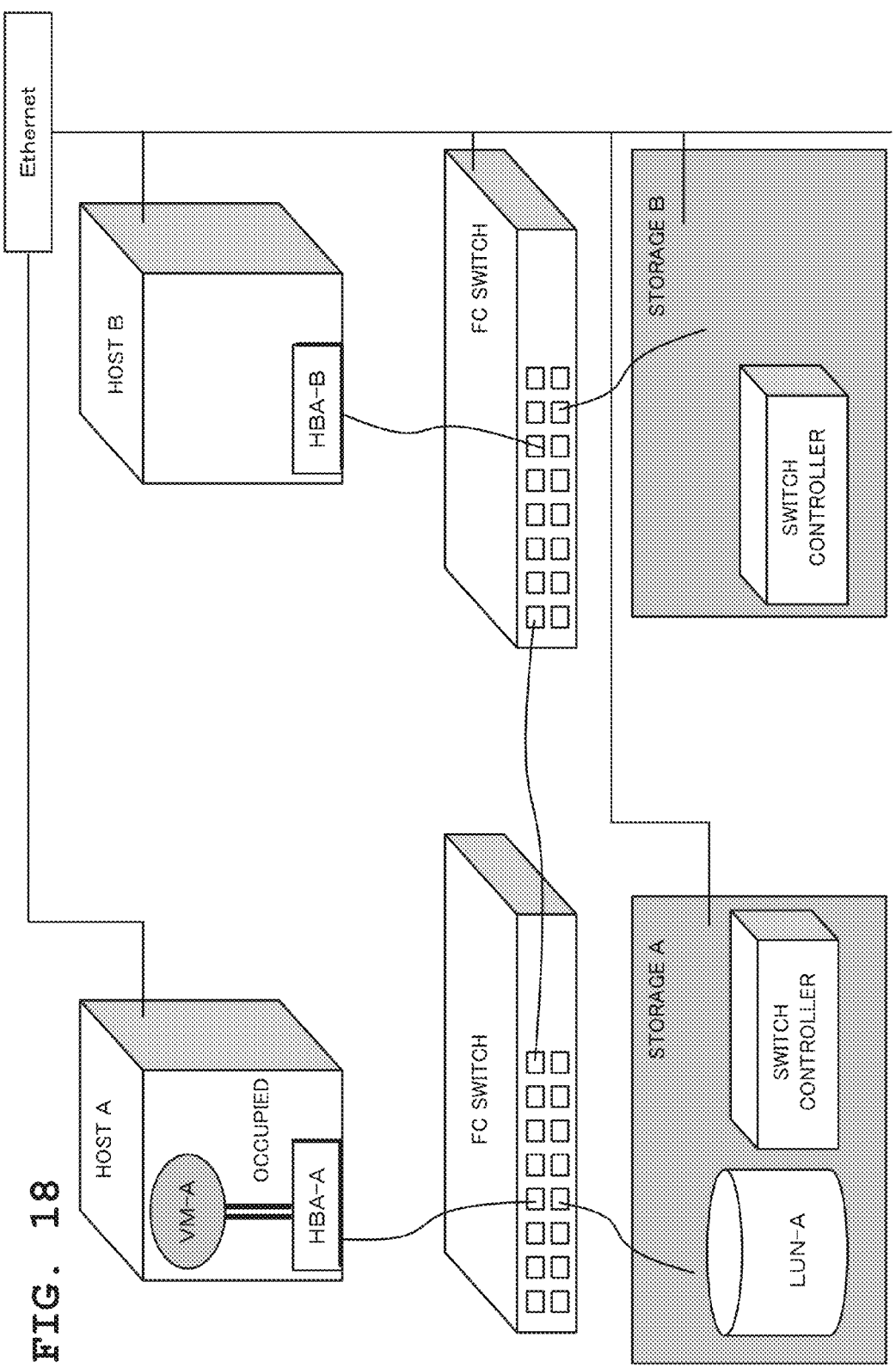
FIG. 18 is a block diagram showing a structure of a virtualization system according to a second exemplary embodiment of the present invention.

Storages 140 and 240 have a function of copying data between the storages. These storage each provide an I/F externally operable in the management of its logical unit. Physical geometry of a controller is not particularly limited in the present invention. Arrangement of a controller in the storage will be, for example, as shown in FIG. 18.

Description of Operation of the First Exemplary Embodiment

Next, description of operation of the virtualization system 1000 according to the present embodiment will be made with reference to the drawings in detail.

The description will be here made with respect to a case of migration from the VM host machine 100 (VM host machine A) and the storage 140 (storage A) at a point A to the VM host machine 200 (VM host machine B) and the storage 240 (storage B) at a point B as an example.

In the following, the VM host machine 100 and the VM host machine 200 will be denoted as the VM host machine A and the VM host machine B, respectively. FC switches, storages and HBAs will be similarly denoted as an FC switch A, an FC switch B, a storage A, a storage B, an HBA-A and an HBA-B, respectively.

Step S1: Switch controller 300 also collects information before migration to manage correspondence between VM and HBA as a table.

Detailed operation of Step S1 will be described in the following.

The switch controller 300 obtains information from the VM host machine A and the VM host machine B through the API. Information to be obtained includes a name and a unique identification number of a VM host machine, a name and a unique identification number of a VM on the VM host machine and information about World Wide Name (WWN) of an HBA related to the VM.

The switch controller 300 also obtains information from a name server on a Fabric through the API. Information to be obtained includes WWN (WWPN, WWNN) of an apparatus connected and a 24-bit fiber-channel address (port ID) of the connected apparatus.

The switch controller 300 also combines the above-described information with the WWN information of the HBA as a key to generate a management table 301 including the WWN information of the VM and the HBA correlated with each other.

Figure 4:
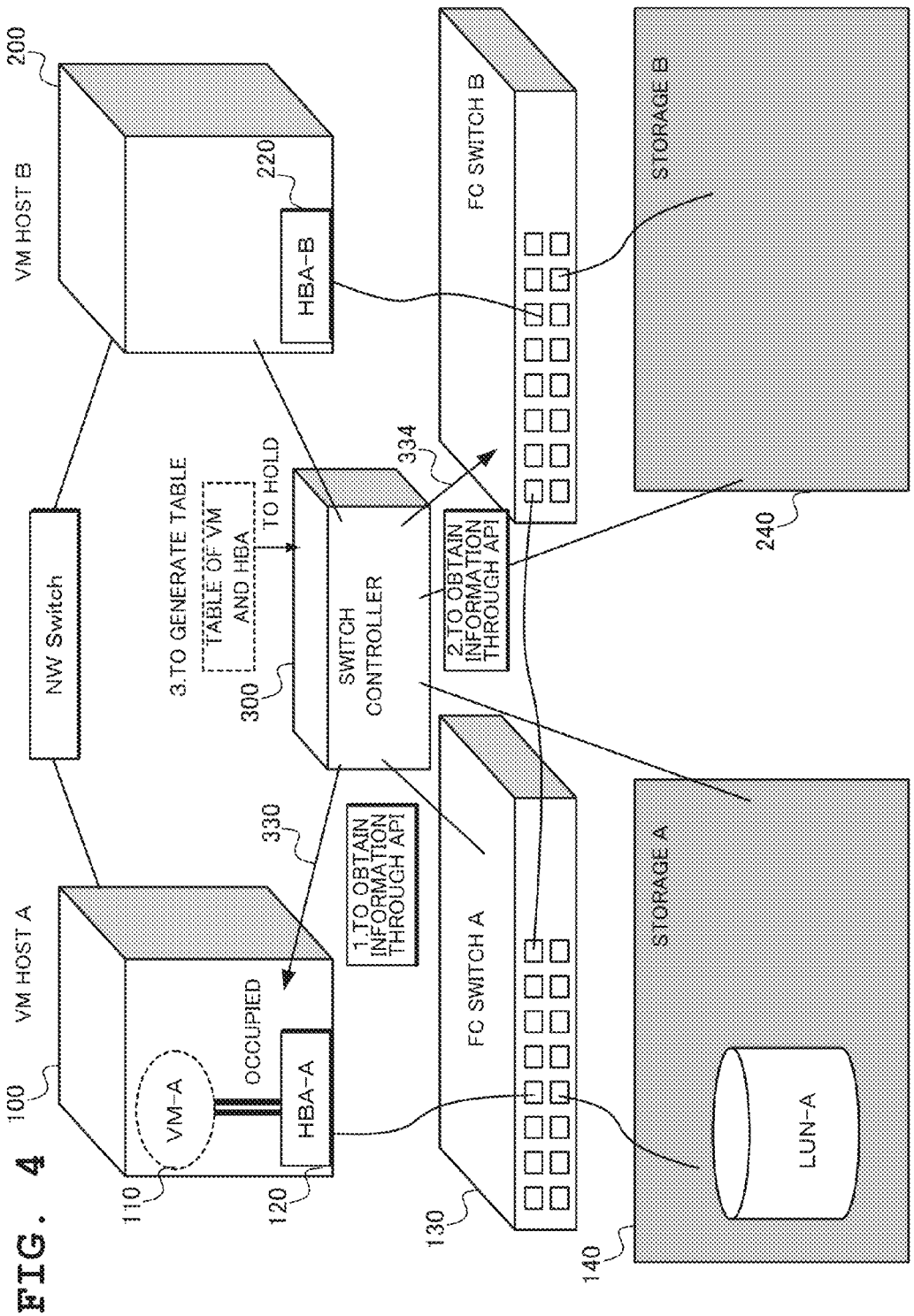
FIG. 4 is a diagram showing operation of the virtualization system according to the first exemplary embodiment of the present invention.

Operation image of Step S1 is shown in FIG. 4. Example of a structure of the management table 301 is shown in FIG. 5.

Step S2: Execute migration of a VM.

Figure 6:
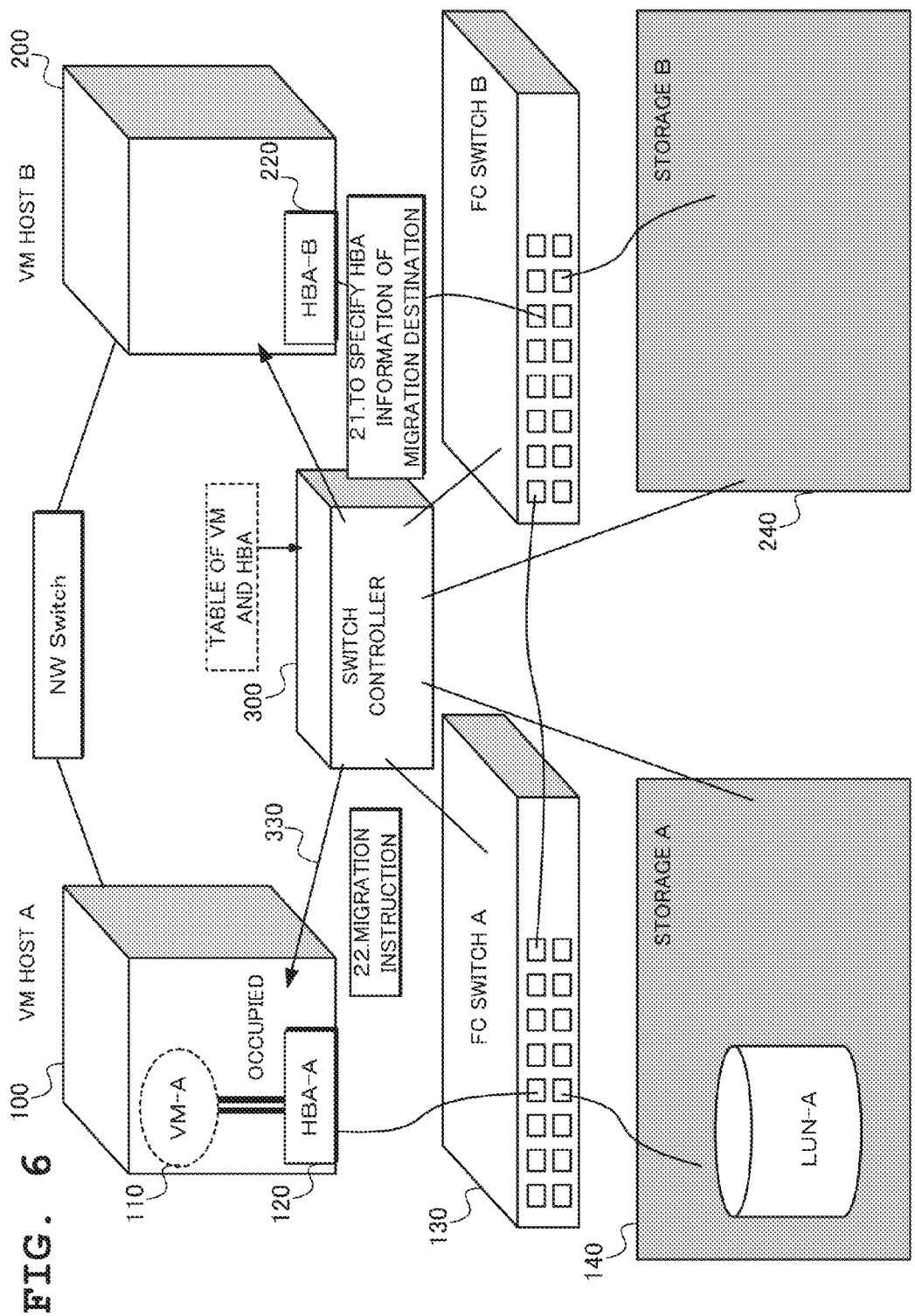
FIG. 6 is a diagram showing operation of the virtualization system according to the first exemplary embodiment of the present invention.

Detailed operation of Step S2 will be described with reference to FIG. 6 and FIG. 7. The switch controller 300 clarifies information of a structure to migrate through the API to the VM host machine. Information to be clarified includes information about which HBA of a migration destination a VM uses. With this information, the switch controller 300 changes the internally provided management table 301 in a manner as shown in FIG. 7.

Subsequently, the switch controller 300 sends a sign for migration execution to the VM host machine A.

Step S3: Execute setting of HBA information on the FC switch such that VM-A on the host machine B accesses the storage A.

Figure 8:
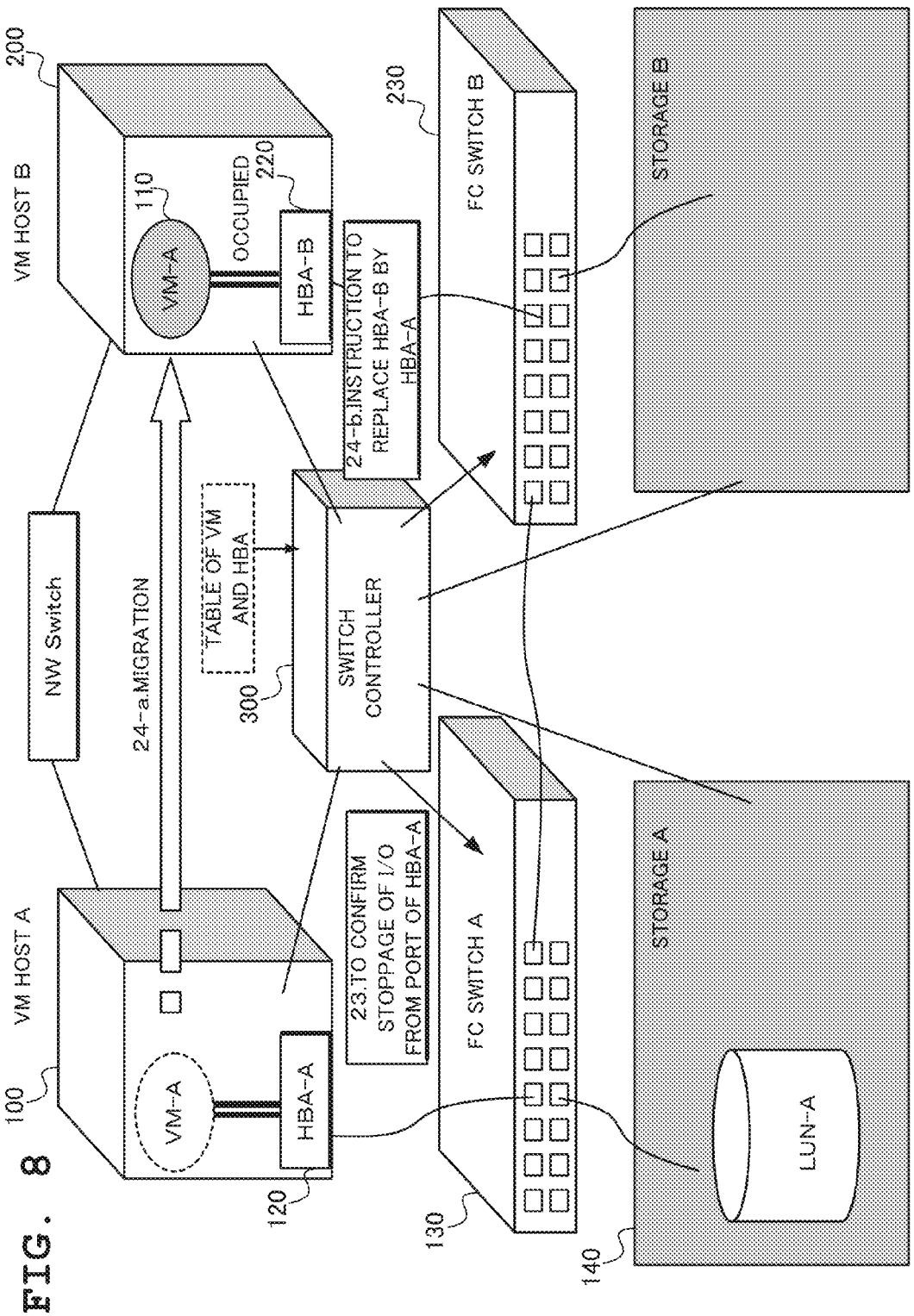
FIG. 8 is a diagram showing operation of the virtualization system according to the first exemplary embodiment of the present invention.

Detailed operation of Step S3 will be described with reference to FIG. 8 and FIG. 9.

First, description will be made with reference to FIG. 8.

The switch controller 300 instructs the FC switch A to which the HBA-A is connected to check stoppage of I/O from the HBA-A. Stoppage of I/O is determined by confirming no I/O for a fixed time period or confirming LOGO (N port logout) from the HBA-A (when no LOGO is issued, the HBA remains connected as hardware to keep log-in to the Fabric).

Since a migration instruction is already issued to the VM host machine A, I/O will be shortly stopped to execute migration. After confirming the stoppage of I/O, the FC switch A notifies the switch controller 300 of the stoppage of I/O.

Upon receiving the notification of the stoppage of I/O, the switch controller 300 gives to the FC switch B to which the HBA-B is connected as a VM-A migration destination an instruction to replace information of the HBA-B.

Figure 9:
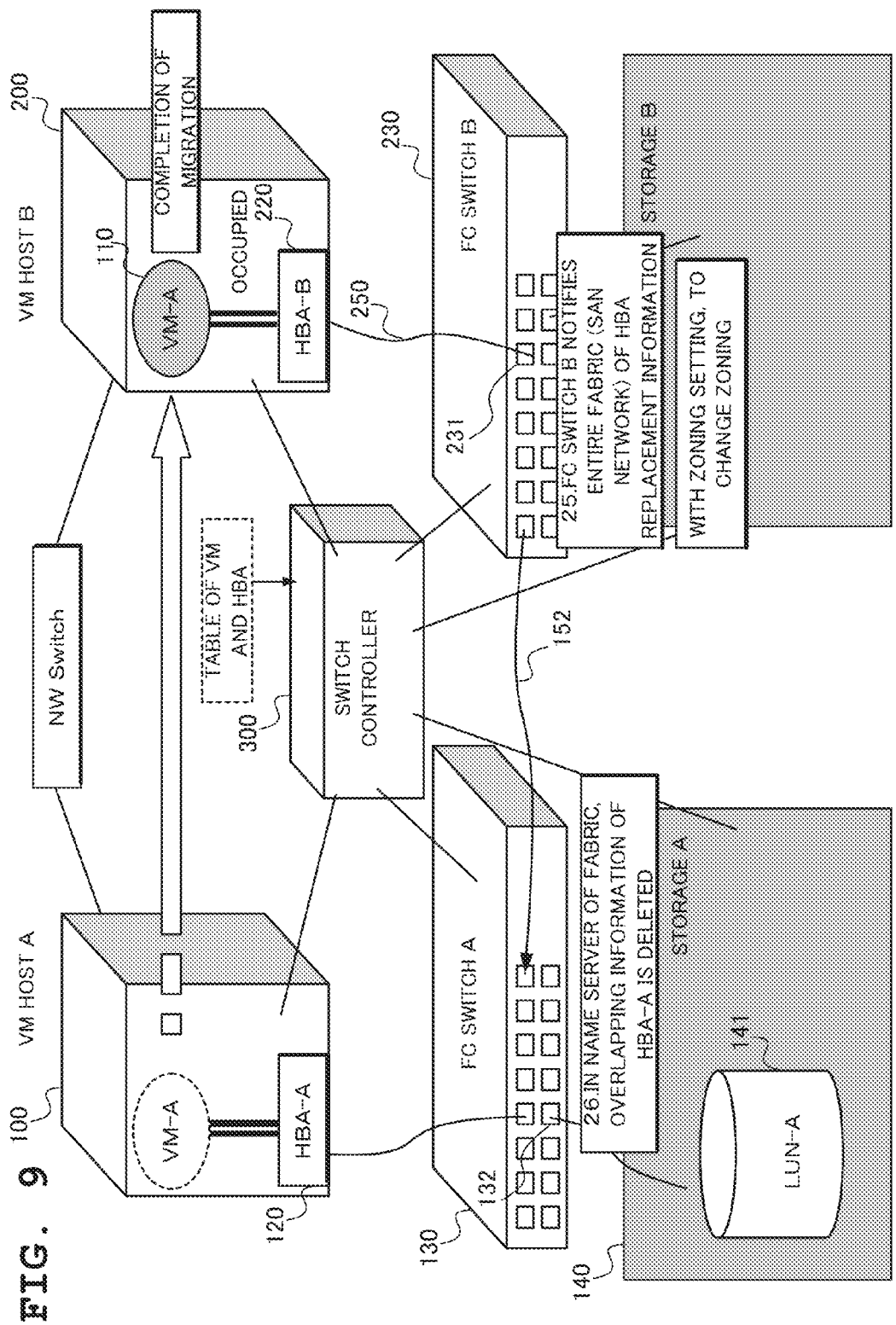
FIG. 9 is a diagram showing operation of the virtualization system according to the first exemplary embodiment of the present invention.

Description will be hereafter made with reference to FIG. 9.

Upon receiving the replacement instruction, the FC switch B checks zoning.

In a case where zoning is set such that an access from a connection port 231 of the HBA-B to the storage A or to a port 132 is disabled (e.g. port zoning), the FC switch B executes appropriate zoning with reference to zoning of the HBA-A so as to enable an access to a LUN-A (Logical Unit Number) also from the connection port of the HBA-B.

In WWN zoning, access is enabled because WWN is replaced. Content of the zoning is kept as a log for later release. At this time, with an HBA-B 220 connected without a host VM, the HBA-B 220 has been already in a Fabric Log-In (FLOGI) state.

After the zoning, the FC switch B notifies the Fabric of information about the HBA-A as of after replacement by using a registered state change notification (RSCN). By the notification, in a name server in the Fabric, even when information of the former HBA-A remains, the former information, which is considered to have been changed, is deleted to have new information. The Fabric as a whole accordingly enters the same state as a state where the HBA-A is connected from another port.

While the above-described operation is executed by the FC switch B and the switch controller 300, migration of the VM-A is completed in the VM host B. Assume that at this time, the VM-A recognizes the HBA-B for the first time by Plug and Play without any problem. Also assume that binding of a host-side driver is automatically executed. These are based on most of implementation today.

Step S4: VM-A accesses the LUN-A on the storage A.

Figure 10:
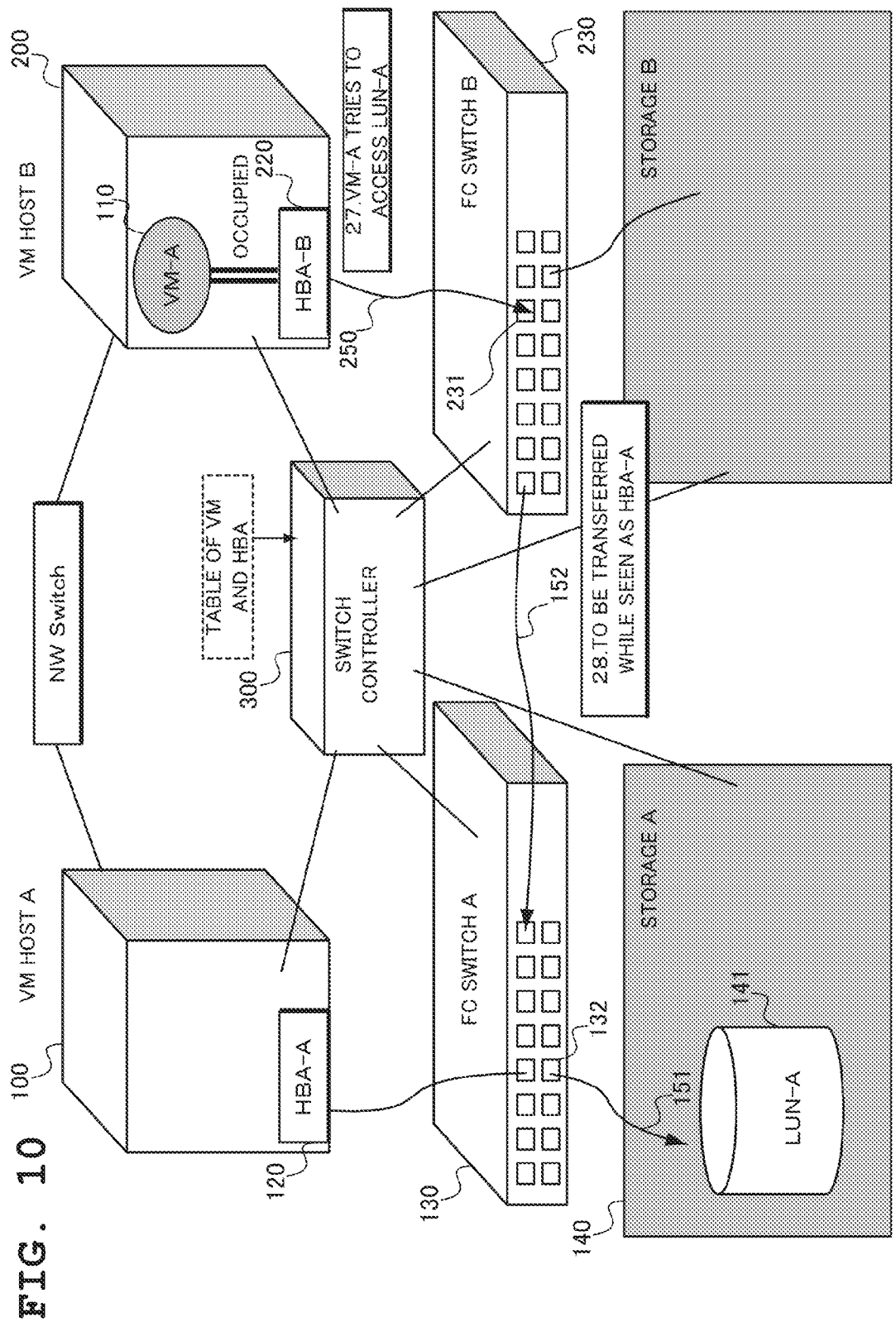
FIG. 10 is a diagram showing operation of the virtualization system according to the first exemplary embodiment of the present invention.
Figure 11:
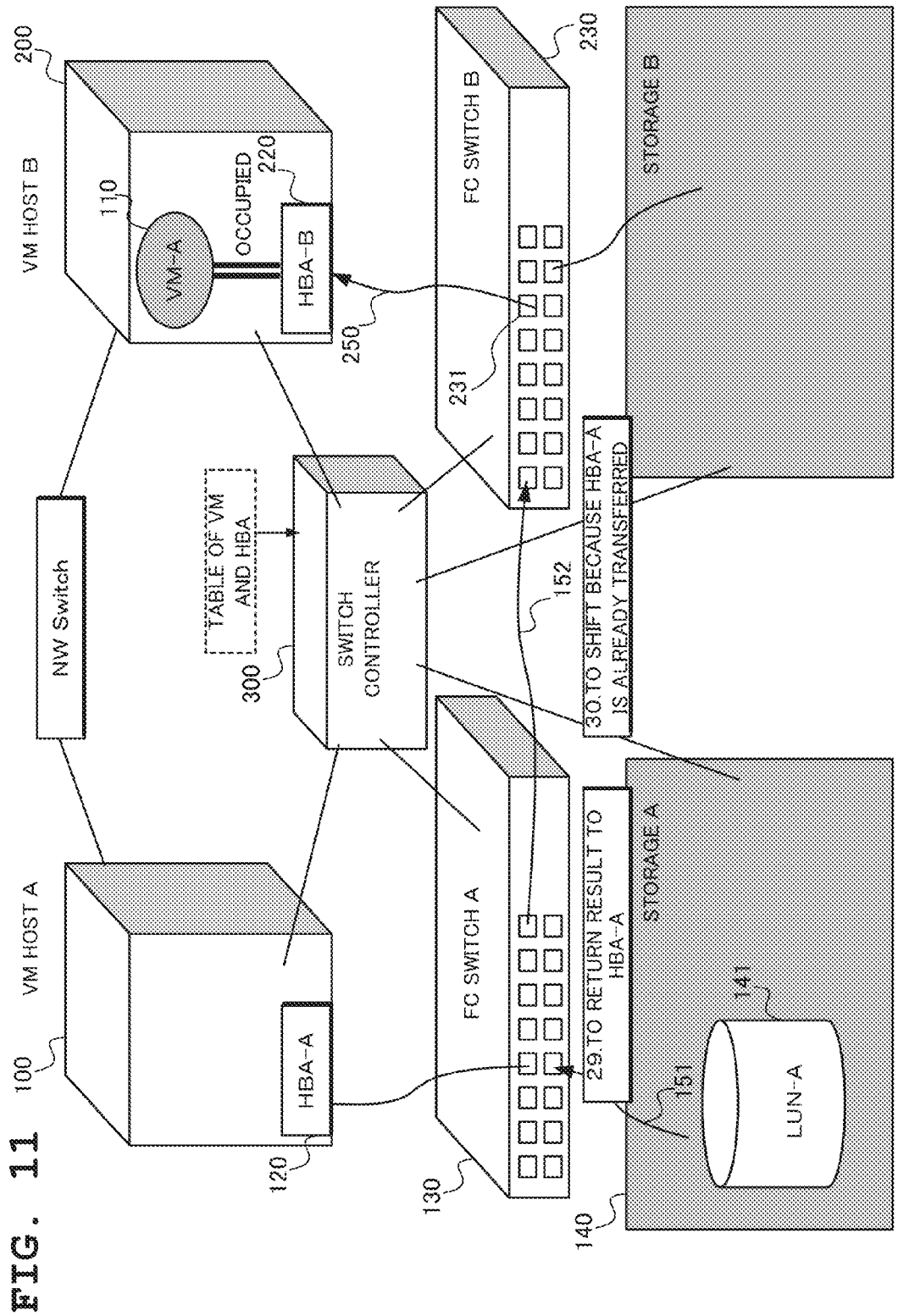
FIG. 11 is a diagram showing operation of the virtualization system according to the first exemplary embodiment of the present invention.

Detailed operation of Step S4 will be described with reference to FIGS. 10, 11 and 12.

After migration of the VM-A is completed, the VM-A tries to access the LUN-A (access with the same information as that of before the migration).

In an access to the port 231 of the FC switch B by the VM-A, if data related to the access involves WWN such as Port Log-In (PLOGI), the data is transferred with WWN of a frame replaced (replace the HBA-B by the HBA-A). Data having no WWN will be transferred with destination information (D_ID) or transmission source information (S_ID) unchanged. Although replacement of WWN is executed in software, when a flag of DF_CTL has no optional header (in a case of DF_CTL=00h), no replacement will be executed to enable high-speed processing.

After the completion of WWN replacement processing, the data is transferred as HBA-A from the FC switch B. Since an access path is already ensured, when accessing from the VM-A, the Fabric is allowed to access the storage A through the port 132 of the switch A without special operation.

The storage A processes the data as an access from the HBA-A to return its result toward the HBA-A. Also when returning the result to the HBA-A, the data passes as the HBA-A through the Fabric to arrive at the FC switch B. Upon finding the data to be directed to the port 231, when the data includes WWN information, the FC switch B executes replacement (replacement of the HBA-A by the HBA-B) and returns the obtained data to the HBA-B.

Step S5: Start data migration of the storage while maintaining the access of Step S4.

Figure 13:
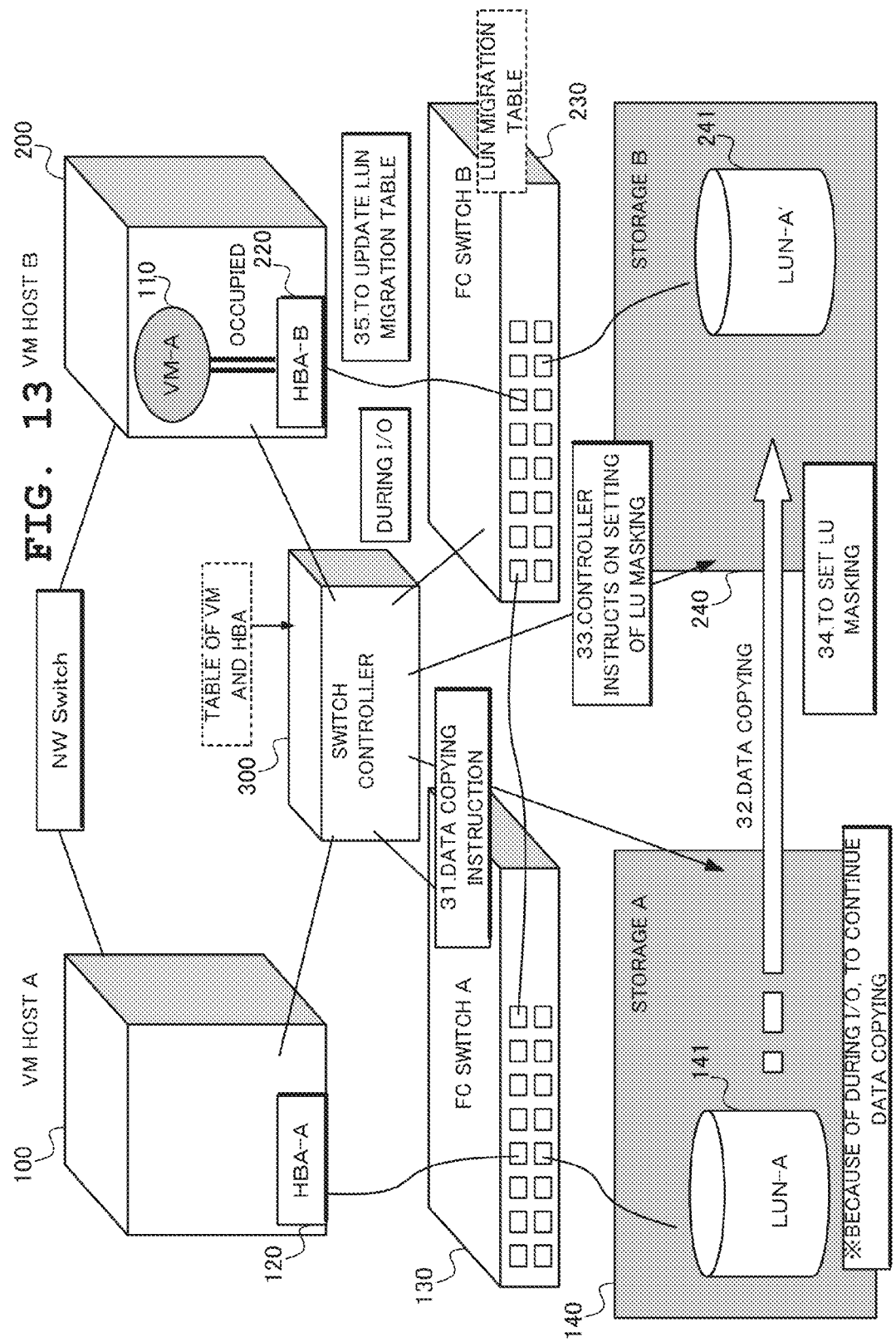
FIG. 13 is a diagram showing operation of the virtualization system according to the first exemplary embodiment of the present invention.

Next, detailed operation of Step S5 will be described with reference to FIG. 13.

In the present step, execute data migration of the storage while maintaining the access from the VM-A to the LUN-A.

First, the switch controller 300 instructs the storage A as a migration source to copy data to the storage B. The storage A and the storage B, which are storages capable of data copying between the storages, enable copying by an instruction through the API.

The present invention has definition of neither a connection method nor a transfer method. While copying data, when original data (data of the storage A) is changed, the change will be reflected as required.

Also at this time, to a LUN-A' to which copy is made, the switch controller 300 instructs on setting of Logical Unit (LU) masking. Setting is executed to allow an access from the HBA-B which will be used at a VM-A migration destination. Since no apparatus which is seen as the HBA-B is connected on the Fabric, inappropriate access in the course of copying is impossible.

Step S6: The FC switch B manages storage migration information as a table.

Next, detailed operation of Step S6 will be described.

After the masking is set, the switch controller 300 collects migration information of the LUN-A to have it in such a table as shown in FIG. 14. With reference to the table, the information is held so as to find to where a former LUN has migrated.

The present exemplary embodiment recites a form of holding a serial number peculiar to a storage and a LUN number unique in the storage as an example. To whichever port on the storage the connection is made, identification is possible with this information. Migration information of LUN shown in the table is distributed also to the Fabric to allow any apparatus connected to the Fabric to obtain information through API or the like.

Step S7: Reset an access from the VM-A to the storage A.

Since Step 7 only involves resetting processing, no description will be made of detailed operation.

8. Release setting executed by the FC switch A in Step S3.

Figure 15:
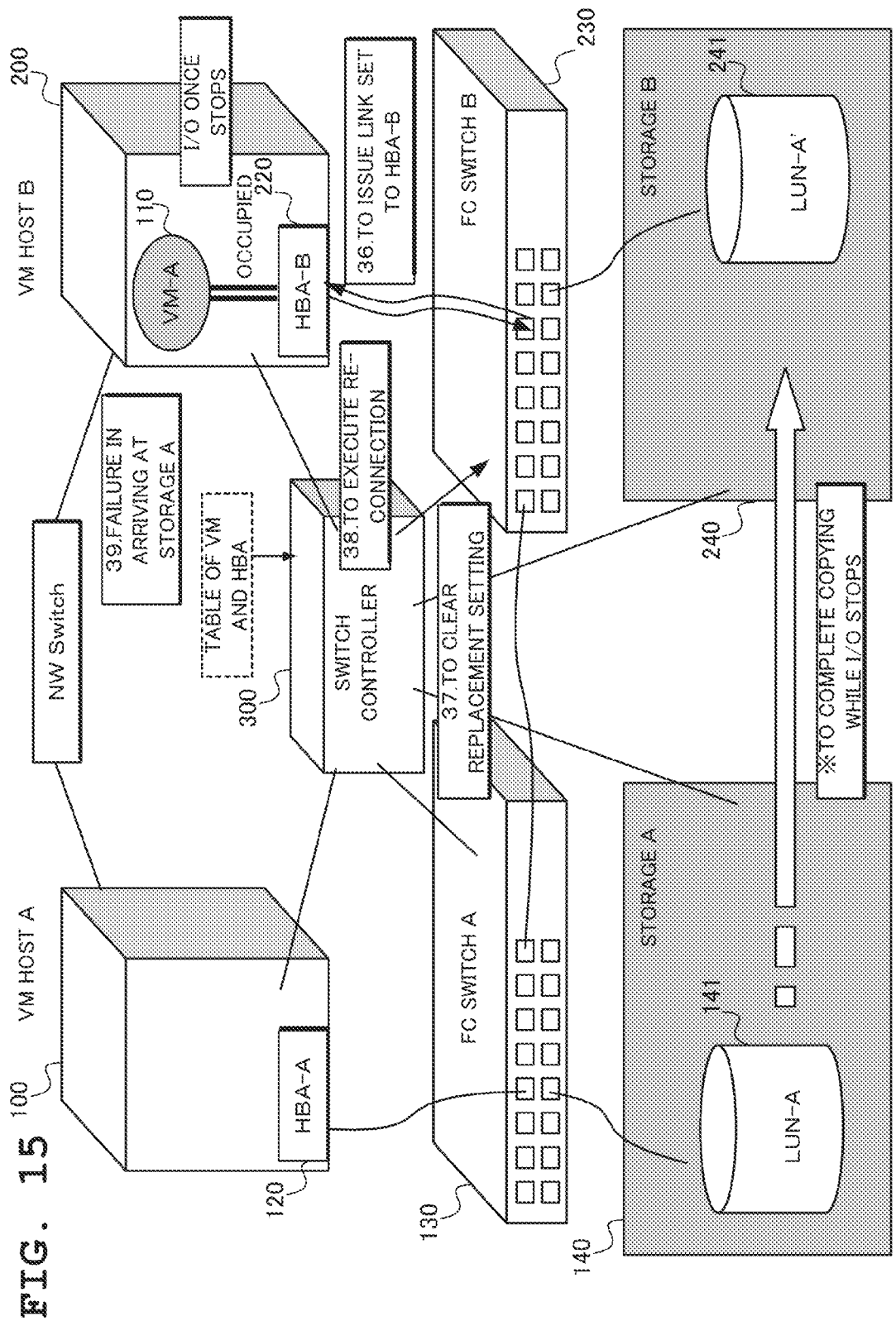
FIG. 15 is a diagram showing operation of the virtualization system according to the first exemplary embodiment of the present invention.

Next, detailed operation of Step S8 will be described with reference to FIG. 15. Upon entering a state where copying the existing part from the LUN-A is completed to have only a copy of a part to be changed as required, the storage A returns such a state to the switch controller 300.

Upon receiving the notification, the switch controller 300 gives an instruction to the FC switch B to reset the HBA-B replacement setting and at the same time, instructs the storage A to complete all the copying.

The FC switch B responsively issues link resetting to the HBA-B. Simultaneously clear setting of replacing the HBA-B by the HBA-A (executed in Step S3) to issue an RSCN so as to clear the setting of the HBA-A also in the Fabric. As to zoning, release setting related to the HBA-A.

The HBA-B having received the link resetting executes re-connection. Since HBA information replacement setting has been cleared then, execute an ordinary FLOGI procedure to transmit to the Fabric that the HBA-B is connected. The storage A, which is not seen from the HBA-B, however, fails to arrive at the Fabric.

Step S9: The VM-A obtains the migration information from the FC switch A to try to connect to the storage B to which migration has been made.

Next, detailed operation of Step S9 will be described with reference to FIG. 16.

HBA-B which has been disabled reconnection after link resetting inquires the Fabric to check whether migration information of LUN is yet to be registered or not. The migration information of LUN set in Step S5 is found to find that the LUN-A has migrated to LUN-A'. When finding a migration destination, transmit to a host VM-A that an access target is to be changed due to the migration (transmission only needs to be discriminated from an ordinary error and in such a case, the VM-A newly inquires the Fabric to obtain changed contents).

Subsequently, the VM-A changes the access target to try to access the LUN-A' on the storage B. Ordinary access is then enabled.

Step S10: VM-A is allowed to access the LUN-A' on the storage B.

Figure 16:
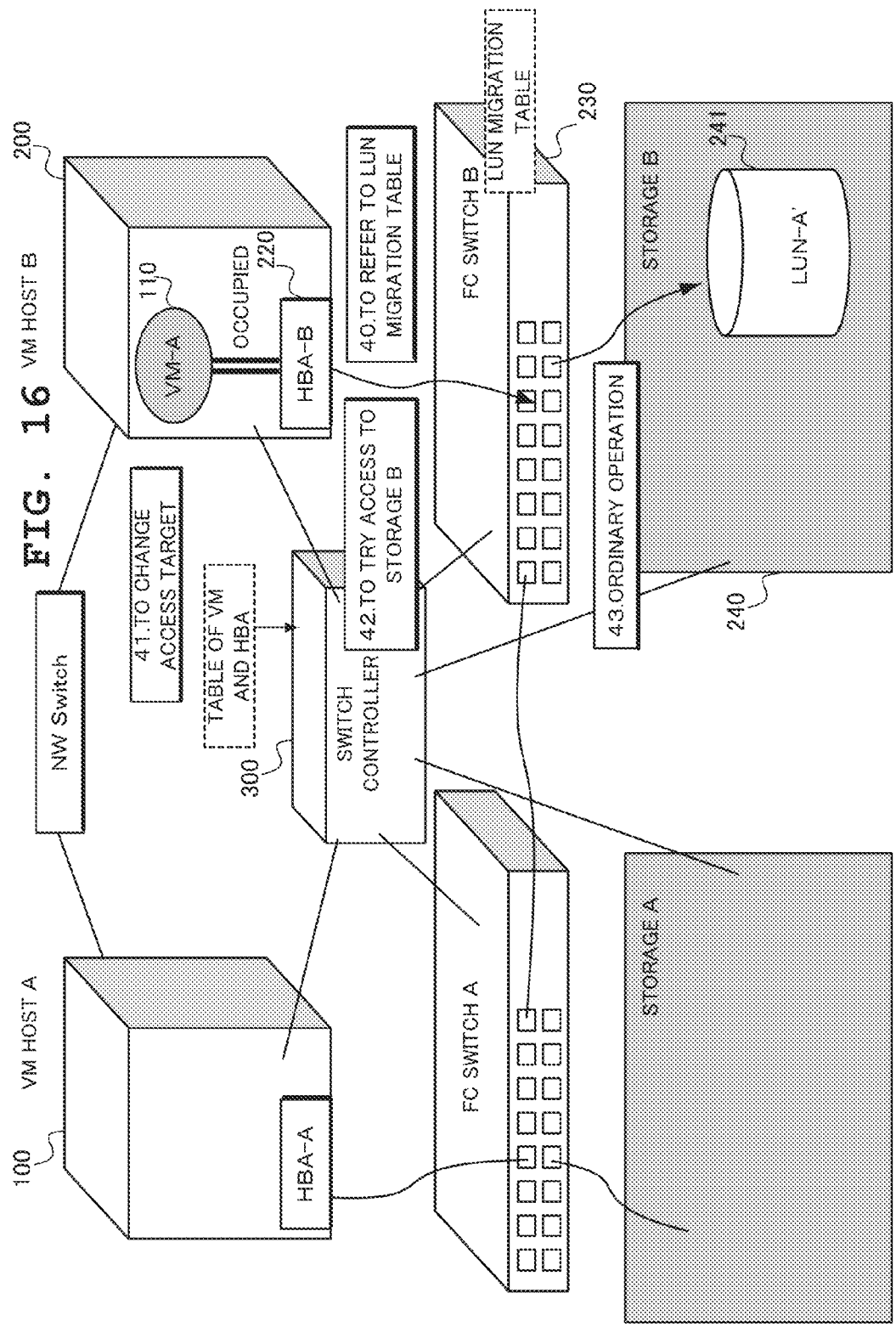
FIG. 16 is a diagram showing operation of the virtualization system according to the first exemplary embodiment of the present invention.
Figure 17:
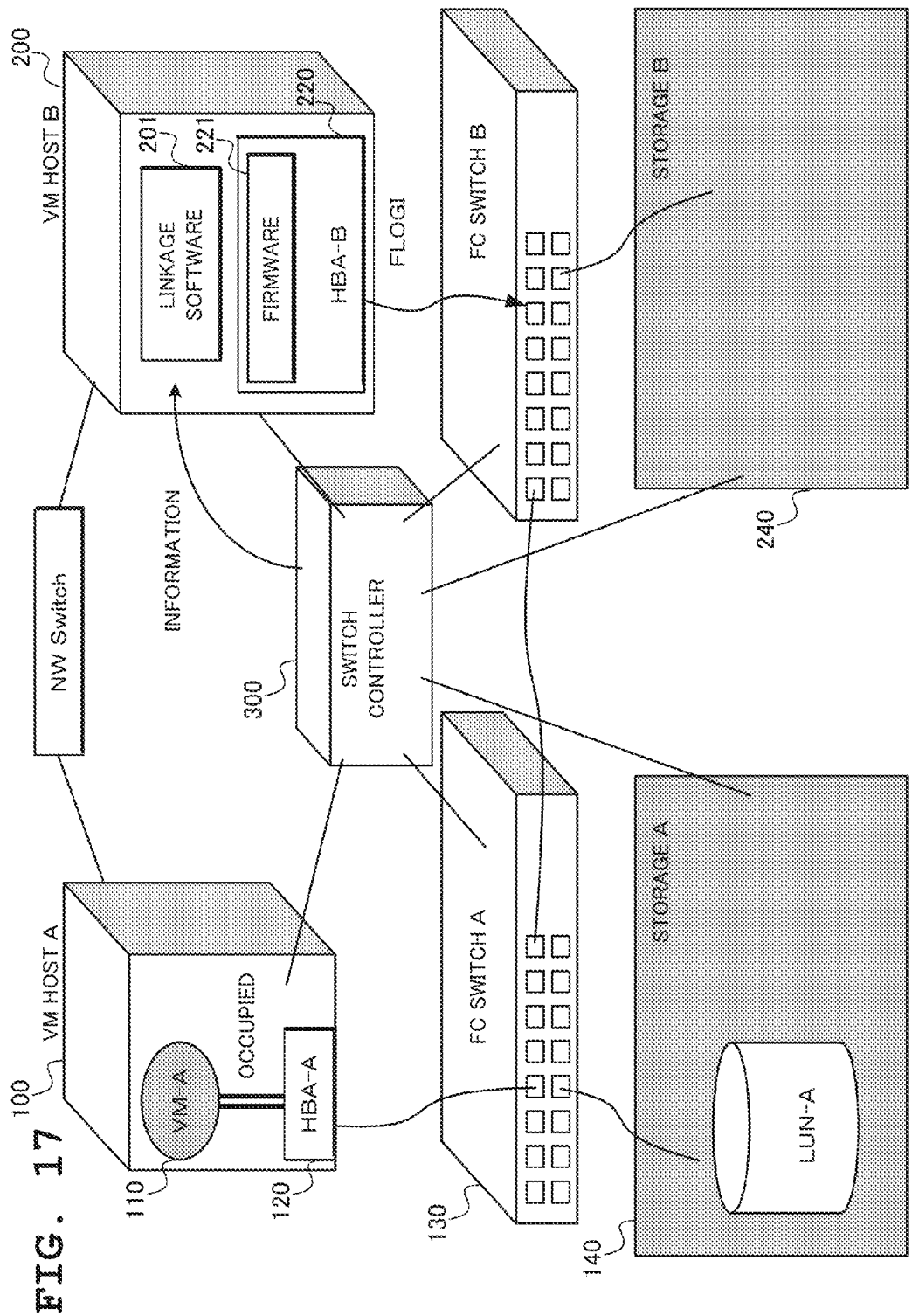
FIG. 17 is a block diagram showing a structure of the virtualization system according to the first exemplary embodiment of the present invention.

As in Step S9, the VM-A, which is now allowed to access the LUN-A', is enabled ordinary I/O in an environment as of after migration (FIG. 16).

Effects of the First Exemplary Embodiment

According to the present exemplary embodiment, VM occupies a physical HBA to enable migration of VM while in operation in an environment for a direct access to a disk.

The present exemplary embodiment also enables reduction in I/O stoppage time period at the time of storage migration.

Figure 19:
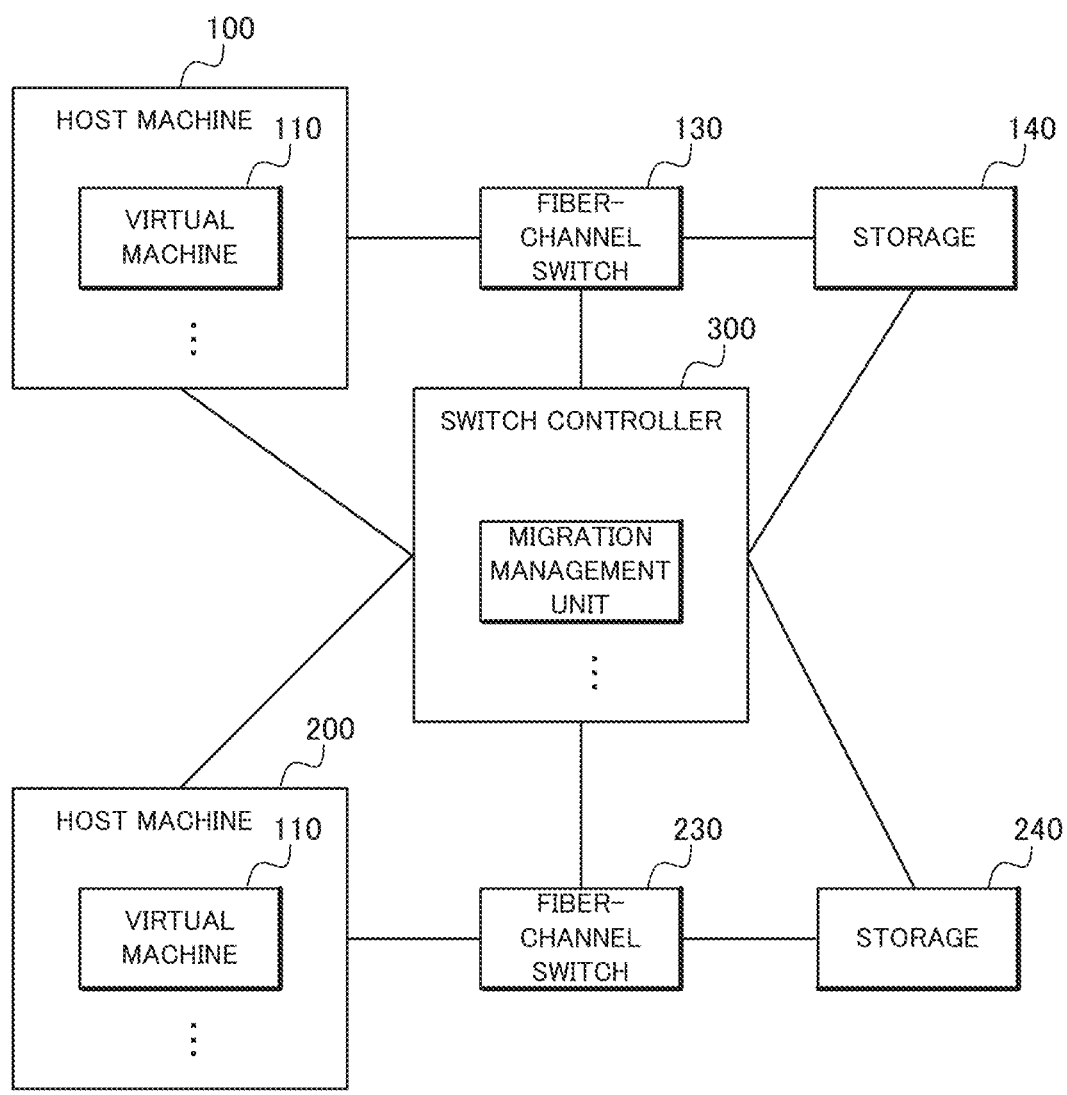
FIG. 19 is a block diagram showing a minimum structure of the virtualization system according to the present invention.

Minimum structure which attains the aims of the present invention is here shown in FIG. 19.

The above-described aims of the present invention can be attained by the virtualization system 1000 including the plurality of host machines 100 or 200 on which a virtual machine 110 operates, the plurality of storages 140 or 240 connected to the host machine 100 or 200 through a fiber-channel switch 130 or 230, and the switch controller 300, the switch controller 300 including the migration management unit which instructs the host machine 100 or 200 on migration of the virtual machine 110, in which the migration management unit instructs a fiber-channel switch connected to a migration destination to set host bus information so as to allow an access to a storage used by the virtual machine 110 having been migrating at a migration source.

Second Exemplary Embodiment

Next, a second exemplary embodiment of the present invention will be described.

In the present exemplary embodiment, HBA information is changed in place of replacement of HBA information by the FC switch. The remaining part of the present exemplary embodiment is the same as that of the first exemplary embodiment and no description will be accordingly made thereof.

Description of Operation of the Second Exemplary Embodiment

Next, detailed description will be made of operation of the virtualization system 1000 according to the present exemplary embodiment with reference to the drawings.

Structural environment is the same as that of the first exemplary embodiment. In the following, operation of the present exemplary embodiment will be described so as to correspond to Steps S1 to S10 described with respect to the first exemplary embodiment.

Step S1 is the same as that of the first exemplary embodiment.

Step S2 of the present exemplary embodiment operates in a manner as described in the following.

Before executing migration, clarify which HBA of a migration destination is to be used. Thereafter, the switch controller 300 gives an instruction to replace WWN (WWPN, WWNN) information of HBA-B on the VM host machine B of the migration destination by the information of the HBA-A.

Structure of an instruction reception side may vary with implementation and one example is shown in FIG. 18. Linkage software 201 is provided on the VM host side to receive an instruction from the switch controller 300. The linkage software 201 exchanges information with firmware 221 of HBA, so that the firmware 221 of the HBA replaces the WWN information of the HBA.

This instruction can be executed while migration is being executed in Step S3. This should be executed before the VM-A starts operation in the host B.

Thereafter, as a result of the change of WWN, the HBA executes FLOGI to the Fabric. This makes the Fabric see the HBA-A shifting.

Step S3 operates in a manner set forth below in the present exemplary embodiment.

Similarly to the first exemplary embodiment, confirm/change zoning. In a case of zoning that disables an access from the connection port 231 of the HBA-B to the storage A or to the port 132 (e.g. port zoning), appropriately execute zoning with reference to zoning of the HBA-A (or the port 132) so as to enable an access also from the connection port of the HBA-B.

Steps S4 to S7 are the same as those of the first exemplary embodiment.

Step S8 operates in a manner set forth below in the present exemplary embodiment.

The controller gives an instruction to the VM host side to reset the replaced information of the HBA-B, so that the HBA once stops I/O to execute LOGO. Then, restore the replacement of WWN. The controller simultaneously gives an instruction to the switch to return the zoning setting.

After the setting is completed, the HBA-B executes re-connection. Since HBA information replacement setting has been cleared then, execute an ordinary FLOGI procedure to transmit to the Fabric that the HBA-B is connected. Since data, however, fails to arrive at the storage A, which is not seen from the HBA-B.

Steps S9 and S10 are the same as those of the first exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

An arbitrary combination of the foregoing components and conversion of the expressions of the present invention to/from a method, a device, a system, a recording medium, a computer program and the like are also available as a mode of the present invention.

In addition, the various components of the present invention need not always be independent from each other, and a plurality of components may be formed as one member, or one component may be formed by a plurality of members, or a certain component may be a part of other component, or a part of a certain component and a part of other component may overlap with each other, or the like.

While the method and the computer program of the present invention have a plurality of procedures recited in order, the order of recitation is not a limitation to the order of execution of the plurality of procedures. When executing the method and the computer program of the present invention, therefore, the order of execution of the plurality of procedures can be changed without hindering the contents.

Moreover, execution of the plurality of procedures of the method and the computer program of the present invention are not limitedly executed at timing different from each other. Therefore, during the execution of a certain procedure, other procedure may occur, or a part or all of execution timing of a certain procedure and execution timing of other procedure may overlap with each other, or the like.

Furthermore, a part or all of the above-described exemplary embodiments can be recited as the following claims but are not to be construed limitative.

The whole or part of the exemplary embodiments disclosed above can be described as, but not limited to, the following supplementary notes.

(Supplementary note 1.) A virtualization system comprising:

a plurality of host machines on which a virtual machine operates, a plurality of storages connected to said host machines through a fiber-channel switch, and a switch controller, said switch controller including a migration management unit which instructs said host machine on migration of said virtual machine, wherein said migration management unit instructs said fiber-channel switch connected to a migration destination to set host bus information so as to allow an access to said storage used at a migration source by said virtual machine which has migrated.

(Supplementary note 2.) The virtualization system according to supplementary note 1, wherein said fiber-channel switch includes a checking unit which checks zoning upon receiving a host bus information setting instruction from said migration management unit, and a setting unit which, when said zoning is set not to allow a host bus adapter of said host machine at the migration destination to access the storage used at the migration source by said virtual machine, executes zoning so as to allow an access to the storage with reference to zoning of said host bus adapter at the migration source.

(Supplementary note 3.) The virtualization system according to supplementary note 2, wherein said setting unit, after setting zoning, notifies information about the zoning to a Fabric by using an RSCN.

(Supplementary note 4.) The virtualization system according to any one of supplementary note 1 through supplementary note 3, wherein said switch controller includes an obtaining unit which obtains, through an API to said host machine, information including a name and a unique identification number of said host machine, a name and a unique identification number of said virtual machine on said host machine and WWN information of a host bus adapter related to said virtual machine, and a management unit which manages correlation between said virtual machine and said host bus adapter in a management table.

(Supplementary note 5.) The virtualization system according to any one of supplementary note 1 through supplementary note 4, wherein said migration management unit instructs said storage at the migration source to copy data to a storage at the migration destination, as well as instructing said storage at the migration destination to set LU masking at data being copied.

(Supplementary note 6.) The virtualization system according to supplementary note 5, wherein said migration management unit manages migration information of said storage in a table.

(Supplementary note 7.) The virtualization system according to supplementary note 6, wherein the migration information of said storage includes a serial number peculiar to said storage and a logical unit number related to copied data.

(Supplementary note 8.) The virtualization system according to any one of supplementary note 5 through supplementary note 7, wherein said fiber-channel switch includes a storage migration information management unit which manages migration information of data of said storage in a table.

(Supplementary note 9.) In a virtualization system comprising a plurality of host machines on which a virtual machine operates, a plurality of storages connected to said host machines through a fiber-channel switch, and a switch controller, wherein said switch controller comprises:

a migration management unit which instructs said host machine on migration of said virtual machine, wherein said migration management unit instructs said fiber-channel switch connected to a migration destination to set host bus information so as to allow an access to said storage used at a migration source by said virtual machine which has migrated.

(Supplementary note 10.) The switch controller according to supplementary note 9, comprising:

an obtaining unit which obtains, through an API to said host machine, information including a name and a unique identification number of said host machine, a name and a unique identification number of said virtual machine on said host machine and WWN information of a host bus adapter related to said virtual machine, and a management unit which manages correlation between said virtual machine and said host bus adapter in a management table.

(Supplementary note 11.) The switch controller according to supplementary note 9 or supplementary note 10, wherein said migration management unit instructs said storage at the migration source to copy data to a storage at the migration destination, as well as instructing said storage at the migration destination to set LU masking at data being copied.

(Supplementary note 12.) The switch controller according to supplementary note 11, wherein said migration management unit manages migration information of said storage in a table.

(Supplementary note 13.) The switch controller according to supplementary note 12, wherein the migration information of said storage includes a serial number peculiar to said storage and a logical unit number related to copied data.

(Supplementary note 14.) In a virtualization system comprising a host machine on which a virtual machine operates, a plurality of storages connected to said host machines through a fiber-channel switch, and a switch controller, wherein said fiber-channel switch comprises:

a checking unit which checks zoning upon receiving a host bus information setting instruction from a migration management unit of said switch controller, and a setting unit which, when said zoning is set not to allow a host bus adapter of said host machine at a migration destination of said virtual machine to access the storage used at a migration source by said virtual machine, executes zoning so as to allow an access to the storage with reference to zoning of said host bus adapter at the migration source.

(Supplementary note 15.) The virtualization system according to supplementary note 14, wherein said setting unit, after setting zoning, notifies information about the zoning to a Fabric by using an RSCN.

(Supplementary note 16.) The virtualization system according to supplementary note 14 or supplementary note 15, comprising a storage migration information management unit which manages migration information of data of said storage in a table.

(Supplementary note 17.) In a virtualization system comprising a plurality of host machines on which a virtual machine operates, a plurality of storages connected to said host machines through a fiber-channel switch, and a switch controller, a migration method comprises:

a migration management step of instructing said host machine on migration of said virtual machine by a migration management unit which said switch controller comprises, wherein said migration management step includes instructing said fiber-channel switch connected to a migration destination to set host bus information so as to allow an access to said storage used at a migration source by said virtual machine which has migrated.

(Supplementary note 18.) The migration method according to supplementary note 17, comprising:

the checking step, by a checking unit which said fiber-channel switch comprises, of checking zoning upon receiving a host bus information setting instruction from said migration management unit, and the setting step of, by a setting unit which said fiber-channel switch comprises, when said zoning is set not to allow a host bus adapter of said host machine at the migration destination to access the storage used at the migration source by said virtual machine, executing zoning so as to allow an access to the storage with reference to zoning of said host bus adapter at the migration source.

(Supplementary note 19.) The migration method according to supplementary note 18, wherein said setting step includes after setting zoning, notifying information about the zoning to a Fabric by using an RSCN.

(Supplementary note 20.) The migration method according to any one of supplementary note 17 through supplementary note 19, comprising:

the obtaining step, by an obtaining unit which said switch controller comprises, of obtaining, through an API to said host machine, information including a name and a unique identification number of said host machine, a name and a unique identification number of said virtual machine on said host machine and WWN information of a host bus adapter related to said virtual machine, and the management step, by a management unit which said switch controller comprises, of managing correlation between said virtual machine and said host bus adapter in a management table.

(Supplementary note 21.) The migration method according to any one of supplementary note 17 through supplementary note 20, wherein said migration management step includes instructing said storage at the migration source to copy data to a storage at the migration destination, as well as instructing said storage at the migration destination to set LU masking at data being copied.

(Supplementary note 22.) The migration method according to supplementary note 21, wherein said migration management step includes managing migration information of said storage in a table.

(Supplementary note 23.) The migration method according to supplementary note 22, wherein the migration information of said storage includes a serial number peculiar to said storage and a logical unit number related to copied data.

(Supplementary note 24.) The migration method according to any one of supplementary note 21 through supplementary note 23, wherein a storage migration information management unit which said fiber-channel switch comprises has the storage migration information management step of managing migration information of data of said storage in a table.

(Supplementary note 25.) A migration program in a virtualization system comprising a plurality of host machines on which a virtual machine operates, a plurality of storages connected to said host machines through a fiber-channel switch, and a switch controller, which causes a migration management unit of said switch controller comprises to execute the migration management processing of instructing said host machine on migration of said virtual machine, wherein said migration management processing includes instructing said fiber-channel switch connected to a migration destination to set host bus information so as to allow an access to said storage used at a migration source by said virtual machine which has migrated.

(Supplementary note 26.) The migration program according to supplementary note 25, which causes a checking unit which said fiber-channel switch comprises to execute the checking processing of checking zoning upon receiving a host bus information setting instruction from said migration management unit, and a setting unit which said fiber-channel switch comprises to execute the setting processing of, when said zoning is set not to allow a host bus adapter of said host machine at the migration destination to access the storage used at the migration source by said virtual machine, executing zoning so as to allow an access to the storage with reference to zoning of said host bus adapter at the migration source.

(Supplementary note 27.) The migration program according to supplementary note 26, wherein said setting processing includes after setting zoning, notifying information about the zoning to a Fabric by using an RSCN.

(Supplementary note 28.) The migration program according to any one of supplementary note 25 through supplementary note 27, which causes an obtaining unit which said switch controller comprises, to execute the obtaining processing of obtaining, through an API to said host machine, information including a name and a unique identification number of said host machine, a name and a unique identification number of said virtual machine on said host machine and WWN information of a host bus adapter related to said virtual machine, and a management unit which said switch controller comprises to execute the management processing of managing correlation between said virtual machine and said host bus adapter in a management table.

(Supplementary note 29.) The migration program according to any one of supplementary note 25 through supplementary note 28, wherein said migration management processing includes instructing said storage at the migration source to copy data to a storage at the migration destination, as well as instructing said storage at the migration destination to set LU masking at data being copied.

(Supplementary note 30.) The migration program according to supplementary note 29, wherein said migration management processing includes managing migration information of said storage in a table.

(Supplementary note 31.) The migration program according to supplementary note 30, wherein the migration information of said storage includes a serial number peculiar to said storage and a logical unit number related to copied data.

(Supplementary note 32.) The migration program according to any one of supplementary note 29 through supplementary note 31, which causes a storage migration information management unit which said fiber-channel switch comprises to execute the storage migration information management processing of managing migration information of data of said storage in a table.

What is claimed is:

1. A virtualization system comprising:
   a plurality of host machines which includes a plurality of host bus adapters, the plurality of host bus adapters each having different identity information;
   a plurality of storages connected to said host machines through a fiber-channel switch;
   a virtual machine which operates on the plurality of host machines and directly accesses the plurality of storages through the host bus adapter being used dedicatedly by the virtual machine; and
   a switch controller, said switch controller including a migration management unit which instructs said host machine on migration of said virtual machine, wherein
   said migration management unit obtains information of which host bus adapter dedicatedly used by the virtual machine after migration to the plurality of host machines and instructs said fiber-channel switch connected to a migration destination to set host bus adapter information so as to allow an access to said storage used at a migration source by said virtual machine which has migrated, said virtual machine using the host bus adapter with an identity information which is different from an identity information used before migration,
   wherein said migration management unit instructs said storage at the migration source to copy data to a storage at the migration destination, as well as instructing said storage at the migration destination to set LU masking at data being copied, and manages, in a table, data migration information of said storage after setting the LU masking,
   wherein the host bus adapter used by the virtual machine which has migrated checks registration of the data migration information in the table and transmits change of an access target to the virtual machine.

2. The virtualization system according to claim 1, wherein said fiber-channel switch includes
   a checking unit which checks zoning upon receiving a host bus information setting instruction from said migration management unit, and a setting unit which, when said zoning is set not to allow a host bus adapter of said host machine at the migration destination to access the storage used at the migration source by said virtual machine, executes zoning so as to allow an access to the storage with reference to zoning of said host bus adapter at the migration source.

3. The virtualization system according to claim 2, wherein said setting unit, after setting zoning, notifies information about the zoning to a Fabric by using an RSCN.

4. The virtualization system according to claim 1, wherein said switch controller includes
- an obtaining unit which obtains, through an API to said host machine, information including a name and a unique identification number of said host machine, a name and a unique identification number of said virtual machine on said host machine and WWN information of a host bus adapter related to said virtual machine, and
- a management unit which manages correlation between said virtual machine and said host bus adapter in a management table.

5. In a virtualization system comprising a plurality of host machines which includes a plurality of host bus adapters, the plurality of host bus adapters each having different identity information, a plurality of storages connected to said host machines through a fiber-channel switch, a virtual machine which operates on the plurality of host machines and accesses the plurality of storages through the host bus adapter being used dedicatedly by the virtual machine, and a switch controller, wherein said switch controller comprises:
- a migration management unit which instructs said host machine on migration of said virtual machine, wherein said migration management unit obtains information of which host bus adapter dedicatedly used by the virtual machine after migration to the plurality of host machines and instructs said fiber-channel switch connected to a migration destination to set host bus adapter information so as to allow an access to said storage used at a migration source by said virtual machine which has migrated, said virtual machine using the host bus adapter with an identity information different from an identity information used before migration,
- wherein said migration management unit instructs said storage at the migration source to copy data to a storage at the migration destination, as well as instructing said storage at the migration destination to set LU masking at data being copied, and manages, in a table, data migration information of said storage after setting the LU masking,
- wherein the host bus adapter used by the virtual machine which has migrated checks registration of the data migration information in the table and transmits change of an access target to the virtual machine.

6. In a virtualization system comprising a plurality of host machines which includes a plurality of host bus adapters, the plurality of host bus adapters each having different identity information, a plurality of storages connected to said host machines through a fiber-channel switch, a virtual machine which operates on the plurality of host machines and accesses the plurality of storages through the host bus adapter being used dedicatedly by the virtual machine, and a switch controller, wherein said fiber-channel switch comprises:
- a checking unit which checks zoning upon receiving a host bus information setting instruction from a migration management unit of said switch controller, and
- a setting unit which, when said zoning is set not to allow a host bus adapter of said host machine at a migration destination of said virtual machine to access the storage used at a migration source by said virtual machine, executes zoning so as to allow an access to the storage with reference to zoning of said host bus adapter at the migration source,
- wherein said migration management unit obtains information of which host bus adapter dedicatedly used by the virtual machine after migration to the plurality of host machines and instructs said fiber-channel switch connected to a migration destination to set host bus adapter information so as to allow an access to said storage used at a migration source by said virtual machine which has migrated, said virtual machine using the host bus adapter with an identity information different from an identity information used before migration,
- wherein said migration management unit instructs said storage at the migration source to copy data to a storage at the migration destination, as well as instructing said storage at the migration destination to set LU masking at data being copied, and manages, in a table, data migration information of said storage after setting the LU masking,
- wherein the host bus adapter used by the virtual machine which has migrated checks registration of the data migration information in the table and transmits change of an access target to the virtual machine.

7. In a virtualization system comprising a plurality of host machines which includes a plurality of host bus adapters, the plurality of host bus adapters each having different identity information, a plurality of storages connected to said host machines through a fiber-channel switch, a virtual machine which operates on the plurality of host machines and accesses the plurality of storages through the host bus adapter being used dedicatedly by the virtual machine, and a switch controller, a migration method comprises:
- a migration management step of instructing said host machine on migration of said virtual machine by a migration management unit which said switch controller comprises, wherein
- said migration management step includes obtaining information of which host bus adapter dedicatedly used by the virtual machine after migration to the host machines and instructing said fiber-channel switch connected to a migration destination to set host bus adapter information so as to allow an access to said storage used at a migration source by said virtual machine which has migrated, said virtual machine using the host bus adapter with an identity information different from an identity information used before migration,
- wherein said migration management step instructs said storage at the migration source to copy data to a storage at the migration destination, as well as instructing said storage at the migration destination to set LU masking at data being copied, and manages, in a table, data migration information of said storage after setting the LU masking,
- wherein the host bus adapter used by the virtual machine which has migrated checks registration of the data migration information in the table and transmits change of an access target to the virtual machine.

8. A non-transitory computer-readable medium storing a migration program in a virtualization system comprising a plurality of host machines which includes a plurality of host bus adapters, the plurality of host bus adapters each having different identity information, a plurality of storages connected to said host machines through a fiber-channel switch, a virtual machine which operates on the plurality of host machines and accesses the plurality of storages through the host bus adapter being used dedicatedly by the virtual machine, and a switch controller, wherein said migration program causes a migration management unit of said switch controller comprises to execute the migration management processing of instructing said host machine on migration of said virtual machine, wherein said migration management processing includes obtaining information of which host bus adapter dedicatedly used by the virtual machine after migration to the host machines and instructing said fiber-channel switch connected to a migration destination to set host bus adapter information so as to allow an access to said storage used at a migration source by said virtual machine which has migrated, said virtual machine using the host bus adapter with an identity information different from an identity information used before migration wherein said migration management unit instructs said storage at the migration source to copy data to a storage at the migration destination, as well as instructing said storage at the migration destination to set LU masking at data being copied, and manages, in a table, data migration information of said storage after setting the LU masking, wherein the host bus adapter used by the virtual machine which has migrated checks registration of the data migration information in the table and transmits change of an access target to the virtual machine.

\* \* \* \* \*